United States Patent
Rambusch et al.

(10) Patent No.: US 12,187,928 B2
(45) Date of Patent: Jan. 7, 2025

(54) ADHESIVE TAPE FOR WRAPPING CABLES

(71) Applicants: Rene Rambusch, Wuppertal (DE);
Timo Leermann, Wuppertal (DE)

(72) Inventors: Rene Rambusch, Wuppertal (DE);
Timo Leermann, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 353 days.

(21) Appl. No.: 17/764,545

(22) PCT Filed: Sep. 16, 2020

(86) PCT No.: PCT/EP2020/075833
§ 371 (c)(1),
(2) Date: Nov. 3, 2022

(87) PCT Pub. No.: WO2021/069185
PCT Pub. Date: Apr. 15, 2021

(65) Prior Publication Data
US 2023/0065871 A1 Mar. 2, 2023

(30) Foreign Application Priority Data
Oct. 11, 2019 (DE) .................... 20 2019 105 633.9

(51) Int. Cl.
*B32B 3/10* (2006.01)
*C09J 7/21* (2018.01)

(52) U.S. Cl.
CPC ........... *C09J 7/21* (2018.01); *C09J 2203/302* (2013.01); *C09J 2301/16* (2020.08); *C09J 2400/263* (2013.01); *C09J 2467/006* (2013.01); *C09J 2477/006* (2013.01)

(58) Field of Classification Search
None
See application file for complete search history.

(56) References Cited

U.S. PATENT DOCUMENTS

| | | | |
|---|---|---|---|
| 6,790,505 B1 | 9/2004 | Goux | |
| 10,351,734 B2 | 7/2019 | Lodde | |
| 2016/0304751 A1* | 10/2016 | Müssig | .................... C09J 7/255 |
| 2021/0371708 A1 | 12/2021 | Leermann | |

FOREIGN PATENT DOCUMENTS

| | | | |
|---|---|---|---|
| DE | 202017106797 U | 1/2018 | |
| EP | 1136535 A2 * | 9/2001 | ............ B32B 27/12 |
| EP | 1136535 A | 5/2004 | |

OTHER PUBLICATIONS

Machine translation of EP-1136535-A2 (Year: 2001).*

* cited by examiner

*Primary Examiner* — Christopher M Polley
(74) *Attorney, Agent, or Firm* — Andrew Wllford

(57) ABSTRACT

An adhesive tape for bundling cables is made by first making a velour substrate band entirely or partially of bio-based polymer fibers and/or bio-based polymer filament and having a front face from which projects a dense array of loops and a back face. Then an adhesive coating is applied to a back face of the substrate band to make therefrom an adhesive tape meeting abrasion class C of LV 312. This adhesive tape is used by being wound around a plurality of motor-vehicle cables with the adhesive engaging the cables and the front face and loops turned away from the cables.

15 Claims, 1 Drawing Sheet

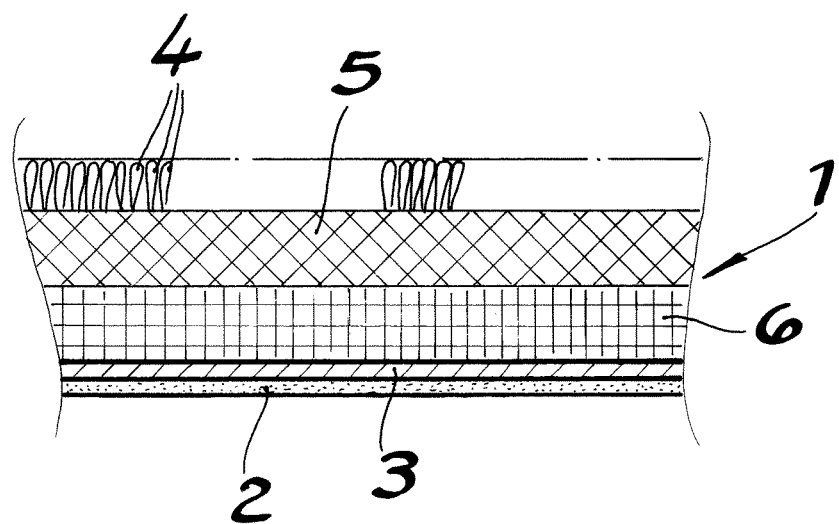

ADHESIVE TAPE FOR WRAPPING CABLES

CROSS REFERENCE TO RELATED APPLICATIONS

This application is the US-national stage of PCT application PCT/EP2020/075833 filed 16 Sep. 2020 and claiming the priority of German patent application 202019105633.9 itself filed 11 Oct. 2019.

The invention relates to an adhesive tape, in particular a tape for wrapping cables in automobiles, comprising a predominantly textile substrate band and an adhesive coating applied to the substrate band on one or both faces, the textile substrate band being made entirely or partially of bio-based polymer fibers and/or polymer filaments.

Adhesive tapes and in particular winding tapes for wrapping cables in automobiles are used in order to bundle the cables in question or also protect them from mechanical abrasion. In this connection, not only is solvent resistance with respect for example to oil and gasoline but also temperature resistance of great importance. In fact, such adhesive tapes and in particular winding tapes are typically used in a temperature range between −50° C. and up to +150° C. and more. In order to prevent any rattling noises of the cable harness provided for example at this point, sound emissions are also to be suppressed. The invention also relates to increased abrasion resistance in order to prevent piercing from contact with the vehicle body.

The abrasion resistance of the adhesive tape can be determined in accordance with standard LV 312 (2009) on the basis of abrasion classes. Details of this and the test methods used are described in DE 20 2012 103 975 [U.S. Pat. No. 10,351,734]. For example, the abrasion class B corresponds to the fact that, in the bonded state, the relevant adhesive tape is adhered to a 5 millimeter mandrel, such that taking into account a weight load of 10 N at least 100 strokes are needed for penetration.

In addition to the noise-damping effect, the required abrasion and media and temperature resistance, it is also often necessary that the adhesive tape or strip in question be manually torn. This is because the winding tapes in question are typically wound around the cable bundle to be equipped accordingly by an assembly worker. This can be done in a spiral or helix. In principle, it is also possible to make a so-called longitudinal casing of the cable bundle to be equipped with the aid of such an adhesive or winding tape. In any case, the processing often requires the adhesive tape to be cut, which in the simplest case is carried out by simple manual tearing. As a result, manual tearability is of particular importance, which is given for example and corresponding to the explanations in DE 600 31 332 [U.S. Pat. No. 6,790,505] if the adhesive tape has a tensile strength in the transverse direction of less than 10 N. In principle, however, the manual tearability can also be simply assessed and evaluated subjectively on the basis of tests.

In recent times, increased demands are placed on products and technical devices, in particular in the automotive sector, for improved recycling capability and resource-conserving manufacture. Thus, DE 20 2017 106 797 discloses films and in particular protective films partly made of a bio-based polymer. The bio-based polymer is in turn obtained from a plant-based raw material.

Within the scope of the generic teaching according to DE 20 2019 100 588 [US 2021/0371708] of applicant, it is already possible to make an adhesive tape and, in particular, a winding tape for wrapping cables in automobiles in such a way that the textile substrate band is made at least partially with bio-based polymers. For this purpose, the textile substrate band can be made from biohydrated polymer fibers and/or polymer filaments. Possibilities for such a textile substrate band are, inter alia, nonwovens, knitted fabrics, woven fabrics or combinations thereof. This has proven successful in principle, but offers room for further improvements, in particular to make adhesive tapes with reduced sound emission.

The object of the invention is to further develop such an adhesive tape and in particular a tape for wrapping cables in automobiles in such a way that all application-specific requirements in connection with a resource-conserving manufacture are met and rattling noises are effectively suppressed at the same time.

In order to attain this object, the invention proposes in the case of an adhesive tape of the generic type and in particular a winding tape for wrapping cables in automobiles in the context of the invention that the predominantly textile substrate band is velour or is formed mainly by velour. That is, the substrate band is predominantly, i.e. more than 50% by mass, velour, but can also is be partially formed by non-textile components such as, for example, films that are correspondingly less than 50% by mass or weight % Of the substrate band.

The invention therefore first of all uses a special textile substrate band made entirely or partially from bio-based polymer fibers and/or polymer filaments. In addition, in one variant, the textile substrate band is entirely velour. In another variant, the mainly textile woven substrate band can in principle also be a laminate, that is to say a multi-layer substrate band. In the former case, the substrate band has only one layer and hence is formed solely from velour, whereas the laminate variant of the substrate band is multi-layered with at least one layer of the substrate band being velour. The remaining layers can be textile and non-textile layers, as long as the mass or proportion by weight of the textile components of the substrate band is more than 50% of its total mass or weight.

In this variant, it is possible to proceed for example in such a way that the substrate band is a laminate and, in addition to the velour substrate band also has a film layer. In this case, the substrate band is finally embodied as two layers and is composed, on the one hand, of the velour substrate band and, on the other hand, the film layer. It has proven useful here if the film layer is between the velour substrate band and the adhesive coating. As a result, the velour substrate band with its velour loops has its loops turned outward. On the other hand, the adhesive coating is applied to the film layer on the opposite inner face of the adhesive tape, which in turn is between the adhesive coating and the velour substrate band.

In order to achieve a particularly resource-conserving manufacture in this context, the film layer can be a bio-based polymer film layer. In this connection, it has proven useful if the film layer is a bio-polyester film layer, that is to say is made as a film layer based on bio-polyester.

The bio-polyester is advantageously a bio-based PET (polyethylene terephthalate). The basic building blocks of this bio-based polymer are not made from crude oil, but instead are made from renewable raw materials. The renewable raw materials can be those based on plant materials such as starch-containing plants. In addition, such bio-based polymers can also be made by using lactic acid.

In any case, the bio-based polymer film or the bio-based polymer film layer and in particular the bio-polyester film layer can be made and reacted in such a way that, in an example, PET is made by the polycondensation of monoethylene glycol (or ethylene glycol) and terephthalic acid. In this context, the monoethylene glycol can be made from sugar-cane molasses. The terephthalic acid can be bio-based or also petrochemically made.

Thus, the velour substrate band with its advantageously outwardly directed velour loops ensures that the adhesive tape made in this way, and in particular the winding tape, cannot only be made in a particularly resource-conserving manner, but also has special advantages with regard to sound emissions. In fact, the outwardly directed velour loops ensure effective damping of any rattling noises. This means that the velour loops are located on the outwardly facing upper face of the adhesive tape while the adhesive coating is provided on the opposite inner face.

If the adhesive tape is wound, for example, spirally or helically around a cable bundle or a wire harness, the adhesive layer in each case faces inward for fixing the adhesive tape to the cable bundle or cable harness, so that the velour loops automatically face outward as a component of the velour substrate is band and thus for the required noise damping and, in particular, the suppression of any rattling noises. The essential advantages are to be seen herein.

The outwardly facing velour loops typically have a loop length from 0.5 mm to 5 mm and in particular 0.8 mm to 2 mm. Such a loop length has proven to be particularly favorable and practical because, as a result, the velour loops do not project significantly from the adhesive tape and as a result any interlocking with screws, edges or other sharp-edged projections in the interior of the motor vehicle is avoided. On the other hand, the specified length range for the velour loops is sufficient to simultaneously achieve effective noise damping.

The velour substrate band generally has a mesh density of more than 5000 per $dm^2$, in particular the mesh density is of approximately 25,000 per $dm^2$ to 50,000 per $dm^2$. This design provides a tight surface and provides the corresponding velour loops for a particularly large-area noise-damping effect.

The velour substrate band is generally a knit velour substrate band with outwardly pointing velour loops. The velour loops usually form an outer barrier layer in, for example, a surface bond. In principle, super-velvet binding is also possible in this context. In addition to this outer barrier layer with surface bonding or super-surface weaving, an inner barrier layer can also be made in a tricot weaver. The velour loops are advantageously not only integrated into the outer barrier layer, but also into the inner barrier layer therebelow.

Filaments on a polyamide or polyester base are typically used to make the velour substrate band. Since bio-based polymer filaments are usually taken into account in this context, the velour substrate band is made as a whole from filaments based on biopolyamide or bio-polyester. The bio-polyester for the manufacture of the filaments of the velour substrate band is advantageously PET that in turn is made comparable to the PET for making the film layer. This means that in this case, for example, the monoethylene glycol required for this purpose can be made from sugar-cane molasses. The also required terephthalic acid may in turn be made petrochemically or bio-based. This means that comparable raw materials are used for the optional film layer, such as for the filaments for making the velour substrate band.

In this connection, it has proven particularly useful if the velour substrate band is made from filaments based on a bio-polyamide. Furthermore, the invention recommends that the monomers or amines of the biopolyamide consist entirely or partially of castor oil. The also required acid or carboxylic acid can in turn be made in a manner comparable to the terephthalic acid for PET predominantly petrochemically, but also more recently bio-based. In principle, hybrid forms are also conceivable.

As already stated, the predominantly textile substrate band can be designed in one layer, and in this case the textile substrate band is designed wholly as a velour substrate band. In addition, however, the substrate band can also be formed of multicomponent layers. In this case, the substrate band is advantageously designed in two layers and is composed, on the one hand, of the outwardly facing velour substrate band and, on the other hand, the film layer on which the adhesive coating is applied. Thus, the substrate band typically has a weight per unit area from 20 $g/m^2$ to 500 $g/m^2$. The thickness or material thickness of the substrate band is usually between 0.5 mm and 3 mm in order to ensure good processability.

The adhesive coating is then applied either to the back face of the velour substrate band or to the inner barrier layer or is also to the interposed film layer. An application weight of 20 $g/m^2$ to 500 $g/m^2$ has proven to be particularly favorable here. The adhesive used is, for example, a synthetic-rubber adhesive, a hot-melt adhesive, an acrylate-based adhesive, an adhesive based on silicone, polyurethane, polyether and/or polyolefin. In this context, the adhesive can in principle be cross-linked after the coating, in particular by radiation cross linking. In addition, the adhesive coating can be applied to the substrate band over the entire face or in strips.

As a result, an adhesive tape and in particular a winding tape for wrapping cables in automobiles is made available that can be made in a particularly resource-conserving manner. This is because the predominantly textile substrate band is made entirely or partially of bio-based polymer fibers and/or polymer filaments. As a rule, filament are used at this point, that is to say continuous filaments of bio-based polymer. The bio-based polymer is usually a bio-polyamide or bio-polyester base.

If particular abrasion resistance is required, it has proven useful if the velour substrate band is made from filaments based on a bio-polyamide. In fact, it is possible in this way to make adhesive tapes that reach at least abrasion class B and predominantly even the abrasion class C or even D according to LV 312 (2009), as already described above. At the same time, the adhesive tape made in this way is manually tearable, wherein, taking into account an adhesive bandwidth of up to approximately 50 mm, tear strengths in the transverse direction of the adhesive tape of typically 20 N and in particular even 10 N are observed.

Owing to the manufacture of the substrate band predominantly on a biopolyamide or bio-polyester base, not only the previously described abrasion strengths are achieved, but such a substrate band is also distinguished by a high degree of media and temperature resistance. In conjunction with the special capability for sound insulation achieved by the outwardly standing velour loops, the requirements necessary for the selected application are consequently met.

The fineness of the polyamide-based filaments for realizing the velour substrate band is usually between 20 dtex and 100 dtex. As a result of using a polyamide at this point, not only the abrasion resistance can be set high as described, but the stretch to break of the substrate band material can also be predetermined in such a way that it is between 30% and 70%. The tear strength of the entire adhesive tape is typically of about 100 N/cm to 200 N/cm, specifically in the longitudinal direction of the adhesive tape. In the transverse direction of the adhesive tape, lower tear strengths are observed at this point by a factor of 10, which are achieved, for example, in that perforations are introduced into the substrate band in the transverse direction. This occurs as a rule before the application of the adhesive coating. Tear strengths in the transverse direction of approximately 10 N/cm or even less are observed along these perforations, so that the desired manual tearability is present in the transverse direction, which corresponds to tearing forces in the example of 20 N/cm in the maximum.

FIG. 1 shows an embodiment of the adhesive tape according to the invention.

In fact, FIG. 1 shows an adhesive tape used as a wrapping tape for bundling or wrapping cables in automobiles. Its basic construction includes a predominantly textile substrate band having a velour substrate band 1. The velour substrate band 1 in turn has an adhesive coating 2. The adhesive coating 2 at least partially covers the velour substrate band 1, can consequently be applied over its entire face or in strip form.

A film layer 3 is provided between the adhesive coating 2 and the velour substrate band 1. The velour substrate band 1 has outwardly directed velour loops 4. The velour loops 4 primarily serve for sound insulation and form an outer barrier layer 5. The outer barrier layer 5 is surface-bonded.

Furthermore, an inner barrier layer 6 is also provided in a tricot weave according to the embodiment and is between the outer barrier layer 5 and the film layer 3 in the direction of the film layer 3. Both the velour substrate band 1 and the film layer 3 are each biobased as has been described in detail above.

The invention claimed is:

1. A method comprising the steps of:
   making a velour substrate band entirely or partially of bio-based polymer fibers and/or bio-based polymer filament and having a front face from which projects a dense array of loops and a back face;
   applying an adhesive coating to a back face of the substrate band to make therefrom an adhesive tape meeting abrasion class C of LV 312; and
   winding the adhesive tape around a plurality of motor-vehicle cables with the adhesive engaging the cables and the front face and loops turned away from the cables.

2. The method according to claim 1, further comprising the step of:
   forming the velour substrate band has with outwardly facing velour loops with a loop length from 0.5 mm to 5 mm.

3. The method according to claim 1, further comprising the step of:
   imparting to the velour substrate band has a mesh density of more than 5000 per $dm^2$.

4. The method according to claim 1, wherein the velour substrate band is produced by knitting and formed with outwardly directed velour loops in the form of a n surface-bonded outer layer.

5. The method according to claim 1, wherein the velour substrate band is made from filaments based on biopolyamide or bio-polyester.

6. The method according to claim 5, wherein monomers of the biopolyamide consist entirely or partially of castor oil.

7. The method according to claim 1, wherein the substrate band is formed as a laminate and also has a film layer.

8. The method according to claim 7, wherein the film layer is between the velour substrate band and the adhesive coating.

9. The method according to claim 7, wherein the film layer is a bio-based polymer film.

10. The method according to claim 9, wherein the film layer is a biopolyester film.

11. The method according to claim 1, wherein the substrate band is formed to have has a basis weight of 20 $g/m^2$ to 500 $g/m^2$.

12. The method according to claim 1, wherein the substrate band has a material thickness of 0.5 mm to 3 mm.

13. The method according to claim 1, wherein the adhesive coating has an application weight from 20 $g/m^2$ to 200 $g/m^2$.

14. The method according to claim 1, wherein the adhesive used is a synthetic rubber adhesive, a hot-melt adhesive, an acrylate-based adhesive, or a silicone-, polyurethane-, polyether- and/or polyolefin-based adhesive.

15. The method according to claim 1, wherein the adhesive coating is applied to the substrate band over the entire back face or in strips.

* * * * *